No. 681,222. Patented Aug. 27, 1901.
J. P. HOLLAND.
SUBMARINE VESSEL.
(Application filed Oct. 3, 1900.)
(No Model.)
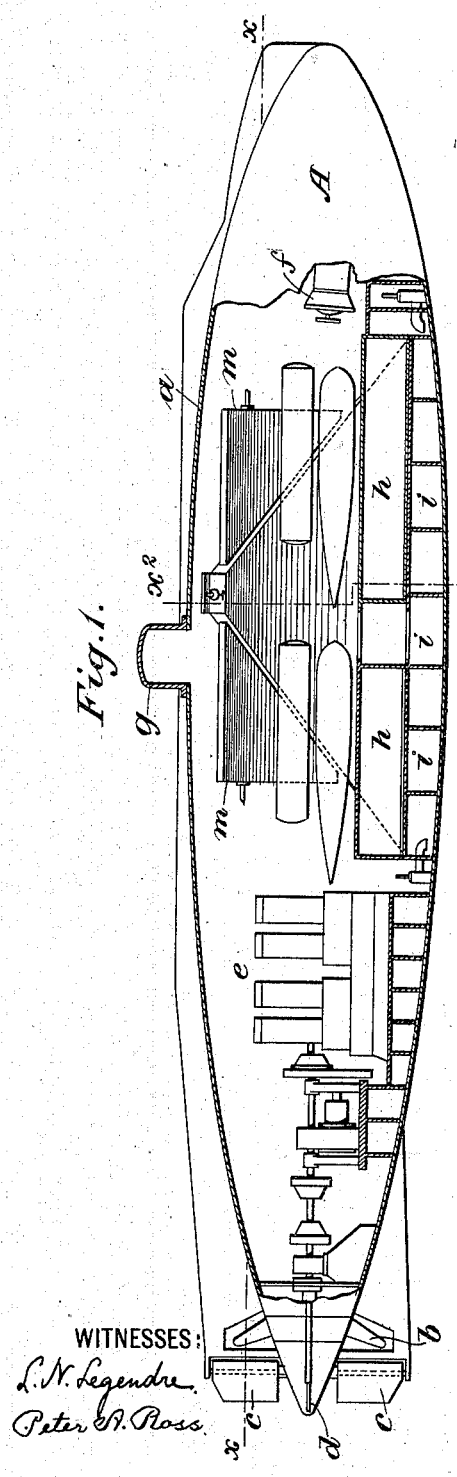
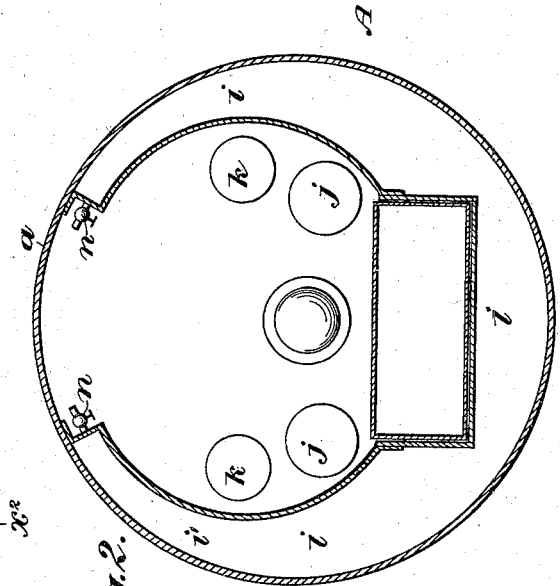
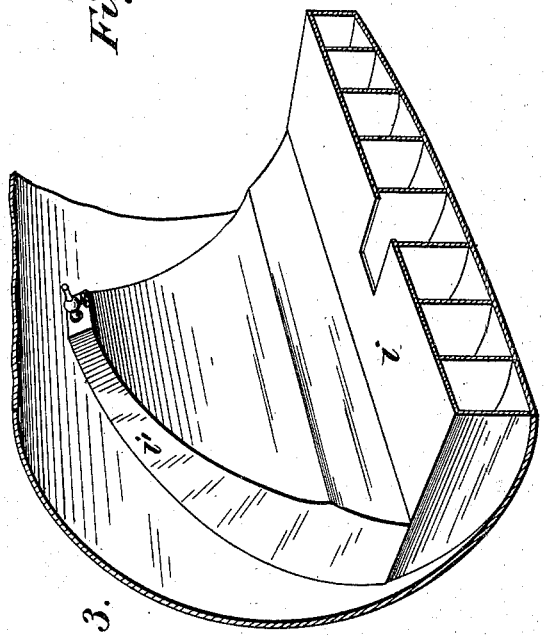
WITNESSES:
L. N. Legendre
Peter A. Ross
INVENTOR
John P. Holland
BY
ATTORNEY

UNITED STATES PATENT OFFICE.

JOHN P. HOLLAND, OF NEWARK, NEW JERSEY, ASSIGNOR TO ELECTRIC BOAT COMPANY, OF NEW JERSEY.

SUBMARINE VESSEL.

SPECIFICATION forming part of Letters Patent No. 681,222, dated August 27, 1901.

Application filed October 3, 1900. Serial No. 31,875. (No model.)

*To all whom it may concern:*

Be it known that I, JOHN P. HOLLAND, a citizen of the United States, residing at Newark, in the county of Essex and State of New Jersey, have invented certain Improvements in Submarine Vessels, of which the following is a specification.

This invention relates to the class of vessels or boats such as are designed mainly for use in war and which are adapted in operation to run both on and under the surface.

Among the essential qualities of a submarine war vessel designed for harbor and shore defense are the power of concealing its approach toward its enemy and of exposing itself for as short a time and as little as possible when coming to the surface for observation or attack. Its field of usefulness lying mostly in the shallow water of harbors and in channels of small width and depth, it is evident that the vessel must be as small as possible consistently with full effectiveness. It must also possess the qualities of handiness and liveliness in a high degree. These qualities combined with moderate dimensions, especially in the proportion of length to diameter, confer the power of rising for observation and of diving again, porpoise fashion, thus reducing the time of exposure to the enemy's projectiles and the risk of being disabled and captured or sunk. As the quality of liveliness is a principal factor in producing the handiness that enables the vessel to rise quickly to the surface and to disappear again rapidly, as well as to maneuver rapidly in a narrow shallow channel, whatever enhances this quality is of great importance in a submarine vessel. In order to secure liveliness, it is essential that the weight per unit of volume shall be greater about the vessel's center of volume than toward her bow and stern. With this object in view the storage battery, which is the heaviest part of her motive machinery, is placed near the center under the cabin or living space and the water ballast is concentrated with its center of volume slightly forward of the center of buoyancy and occupies the space under the storage battery and along its sides and rises at the sides of the cabin nearly to the level of its top near the center on each side.

To facilitate the rapid and complete filling of the water-ballast tanks, their rising flanks or sides on each side of the boat are inclined or tapered toward their tops in order that the air that is expelled by the water entering the tanks while filling may have an uninterrupted passage to the air-escape valves on top of the water-tanks. Should the tops of the tanks be made flat, air would be held in pockets formed by the frames and the tank-covers, thus preventing them from being completely filled and incurring the inconvenience of having a movable center of gravity, due to the movement of water in the empty spaces while the vessel heels.

Spare torpedoes are carried on small trucks and secured at the sides of the cabin. Above each torpedo there is another water-tank capable of holding a quantity of water exactly equal to the weight of the torpedo placed under it. The center of gravity of this volume of water is at approximately the same distance from the center of buoyancy of the vessel as the center of gravity of the torpedo in order that in compensating for the weight of an expended torpedo by filling the water-tank above it there may be produced in the vessel no tendency to heel or lean to one side, and there is no change made in the total weight. In order to still further concentrate the weights about the center of vessel, the air accumulators or chambers are placed fore and aft over the torpedoes at the sides of the cabin, and the main lines of drainage air and electric conductor carriers are stored in the spaces between them.

The internal-combustion or steam and the electric-propulsion engines and their auxiliaries are placed aft of the cabin, and the fuel-tank, auxiliary air-reservoirs, and torpedo-expulsion tubes, with the aerial gun and its magazine of projectiles, if any, are situated forward of the cabin near the bow.

In the accompanying drawings, which illustrate an embodiment of the invention, Figure 1 is a longitudinal vertical axial section of the submarine vessel. Fig. 2 is a transverse section of the same on a scale double that of Fig. 1, the plane of the section being indicated by line $x^2$ in Fig. 1. Fig. 3 is a perspective sectional view of the water-ballast receptacle detached.

A represents the hull or body of the boat, and $x$ the water-level when the boat is running on the surface. The part $a$ of the hull or body above the line $x$ is called the "emersed" portion or body. $b$ is the propeller; $c$, the rudders for horizontal steering; $d$, the rudders for diving; $e$, the engines; $f$, the expulsion-tubes; $g$, the conning-tower or turret; $h$, the storage batteries or accumulators; $i$, the water-ballast tank or receptacle; $j$, the spare torpedoes; $k$, the tanks above them to contain water to compensate for expended torpedoes, and $m$ the tanks for the storage of compressed air.

It will be noted that the water-ballast receptacle $i$ is horseshoe-shaped in cross-section, that its upright branches $i'$ follow the curve of the sides of the cylindrical body of the boat, and that these branches $i'$ are tapered upward at their fore and aft ends, being provided at their highest points with air-cocks $n$. The purpose of this construction has been explained. The air-tanks $m$ occupy the spaces left in tapering the branches $i'$ of the ballast-tank. This tank is normally closed to the water of flotation and below the water-line of the vessel.

Having thus described my invention, I claim—

1. A submarine vessel having its storage batteries or accumulators, water-ballast tank or receptacle, air-tanks, spare torpedoes, and their compensation-tanks grouped symmetrically together in the central section of the vessel, the ballast-tank normally closed to the water of flotation, wholly below the water-line, and extending under the accumulators and up along either side of the boat, substantially as and for the purpose specified.

2. A submarine vessel having a water-ballast receptacle which is of a horseshoe shape in cross-section and fitting into the body of the boat at the central section thereof, said tank being closed normally against the water of flotation and having air-cocks at its most elevated portions, substantially as and for the purpose set forth.

3. A submarine vessel having a horseshoe-shaped water-ballast receptacle $i$, the upwardly-extending portions of which are tapered upward and at its fore and aft ends, and provided with air-cocks at its most elevated portions, substantially as set forth.

4. The combination with a submarine boat having a substantially circular cross-section at its central part, of a water-ballast receptacle $i$, which fits into said boat and is of horseshoe shape in cross-section, the accumulators $h$, between the said upright portions $i'$ of said ballast-receptacle, and the air-tanks and compensation-tanks mounted adjacent to said portions $i'$ of the ballast-receptacle, substantially as set forth.

5. The combination with a submarine boat having a substantially circular cross-section, of the water-ballast receptacle $i$, which fits into the boat and is of horseshoe shape in cross-section with its fore and aft ends tapered upward, and the tanks $m$, at the sides of the boat and adjacent to the respective tapered ends of the said ballast-receptacle, substantially as set forth.

In witness whereof I have hereunto signed my name, this 20th day of September, 1900, in the presence of two subscribing witnesses.

JOHN P. HOLLAND.

Witnesses:
 HENRY CONNETT,
 PETER A. ROSS.